Oct. 18, 1949.  R. D. COLINET  2,485,360
HOLDER FOR ARC WELDING AND ARC CUTTING OF METALS
Filed June 5, 1947  4 Sheets-Sheet 1
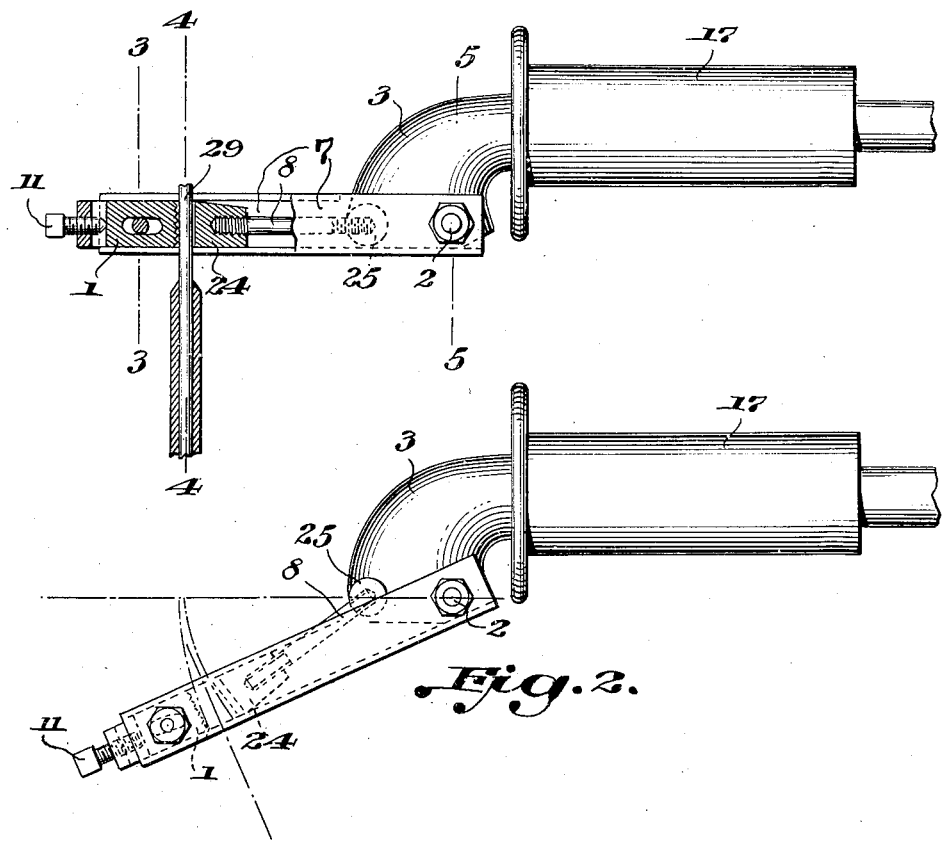
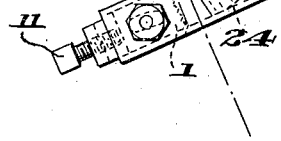
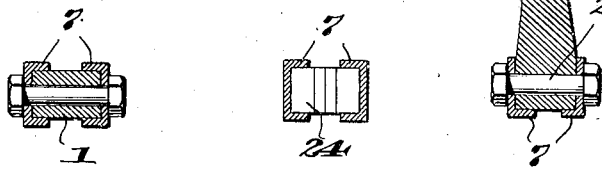
Inventor
R. D. Colinet
By Young, Emery & Thompson
Attorneys.

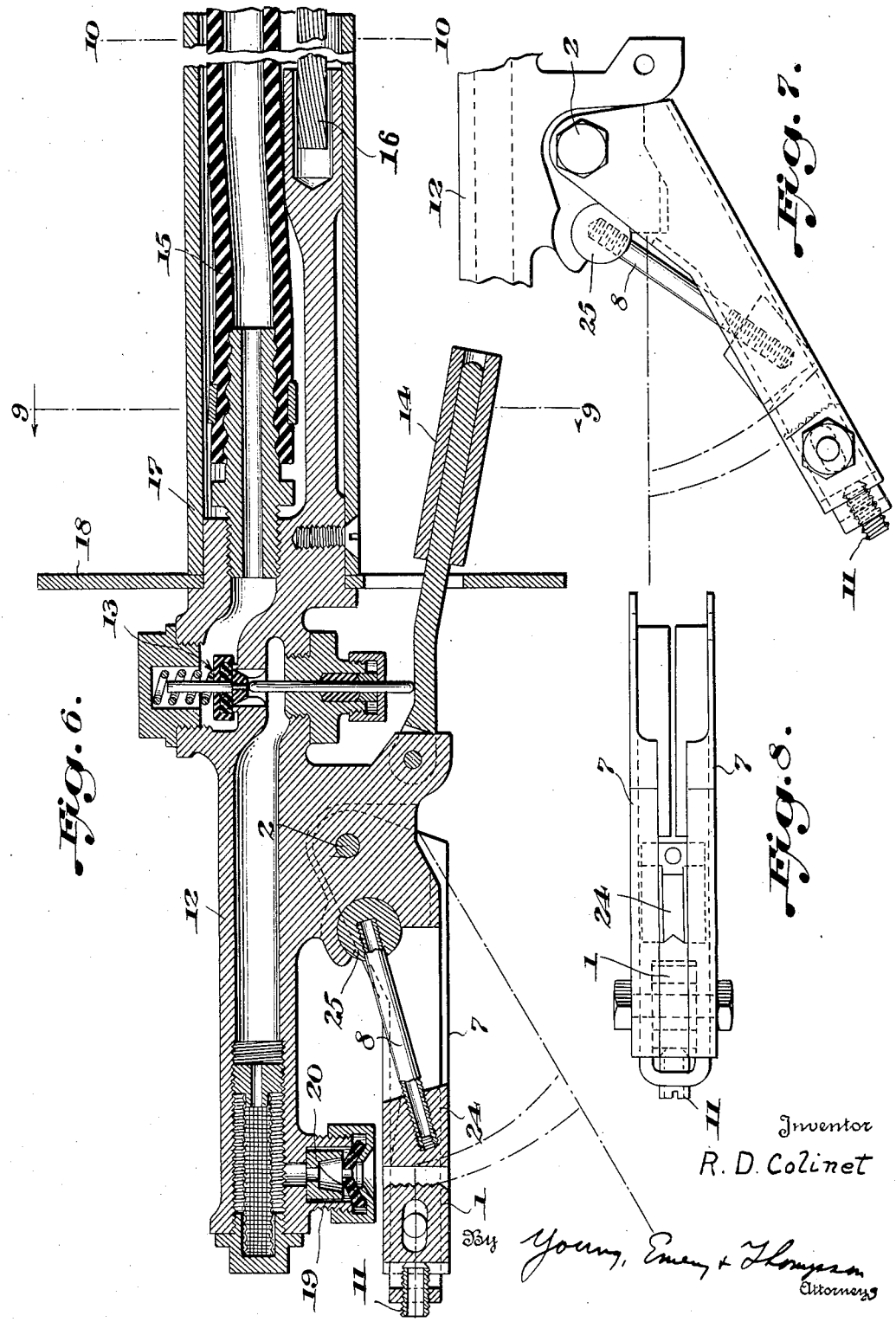

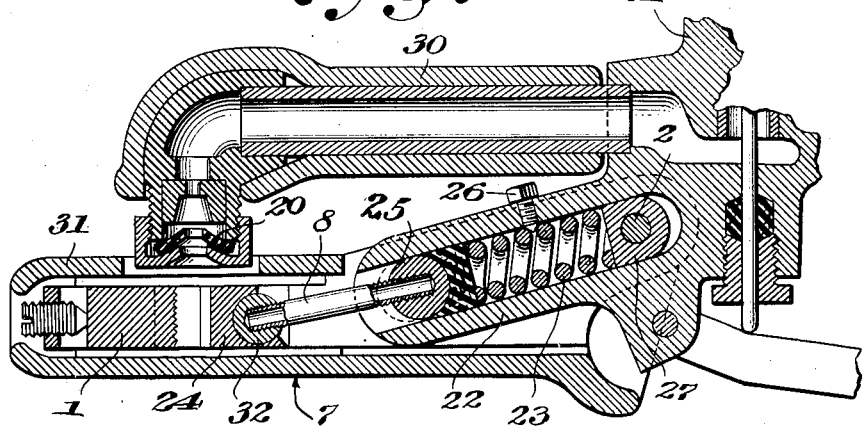

Oct. 18, 1949.    R. D. COLINET    2,485,360
HOLDER FOR ARC WELDING AND ARC CUTTING OF METALS
Filed June 5, 1947    4 Sheets-Sheet 4
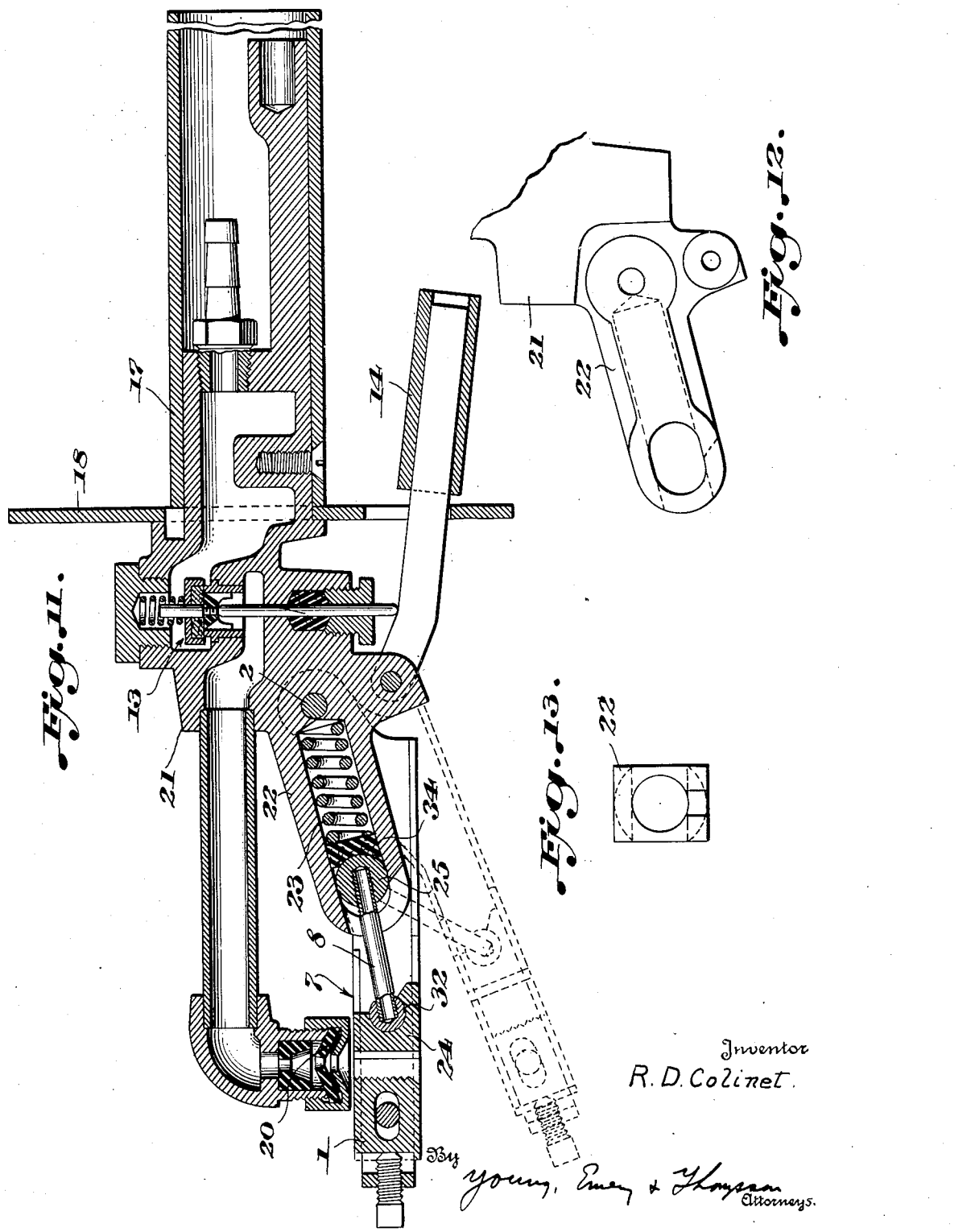

Patented Oct. 18, 1949

2,485,360

UNITED STATES PATENT OFFICE 2,485,360

HOLDER FOR ARC WELDING AND ARC CUTTING OF METALS

Rene D. Colinet, Philadelphia, Pa., assignor to La Soudure Electrique Autogene S. A. Brussels, Belgium Application June 5, 1947, Serial No. 752,728
In Belgium April 1, 1947

7 Claims. (Cl. 219—8)

This invention relates to holders for use in arc welding and cutting, and more particularly in conjunction with hollow electrodes designed to introduce a gas, a liquid or a powder inside the arc.

Such holders usually consist of a gripping member capable of fastening itself by mechanical pressure over the stub end of metallic or other electrodes, providing both an electric contact and a physical hold on the electrode, and at times providing also a gas-tight connection to the passage inside the core of the electrode. Said gripping member is normally secured to a convenient handle for manual operation and also, generally through the handle, to an electric cable for current supply and to a flexible hose for the supply of gas, liquid or powder. One such application, particularly but not exclusively considered, is the cutting of metals by the combined action of an electric arc and of an oxygen jet, generally referred to as the arc-oxygen process. Both the manual and the semi-automatic method using standard electrodes are considered as applications of the invention.

The mechanical hold of the gripping member is either permanently locked, resulting from a spring or cam action depending on stresses built up by some previous deformation of a more or less flexible part or parts of the member, or it depends on muscular action from the hand of the operator, who must then keep a trigger or other conveniently shaped lever depressed as long as the hold on the electrode is desired.

An object of the invention is to provide a considerable permanent pressure upon the electrode, through the easy operation of a self-locking mechanism derived from a toggle system.

Another object of the invention is to reduce the muscular fatigue of the operator when introducing new electrodes in the holder or removing stub ends of used electrodes therefrom, by limiting his physical work to the actual energy absorbed by the electrode while being locked in the holder, plus negligible friction losses. In most spring-loaded holders, the gripping member must be opened wider than the final locked position, in order to provide sufficient space to introduce the electrode freely between the contact jaws, and this requires an over-deformation of the spring, which necessitates a greater muscular action than the pressure force actually remaining in effect after the spring has released part of its tension to bring the jaws to bear on the electrode. In the holder of the invention, the pressure developed by the spring or by slightly elastic members in lieu thereof, increases from zero to a maximum which is reached when the electrode is locked in the holder. At no time does the pressure have to be greater than the final value desired on the electrode.

A further object of the invention is to automatically provide exact centering of the electrode into or against the sealing device, in case of hollow electrodes which are fed with gas, liquid or powder materials.

A still further object is to prevent the accidental release of the grip on the electrode should the latter stick to the work and should the operator attempt to break it loose by violent jerking or pulling on the holder.

Another important object is to automatically provide positive ejection of the stub of a used electrode, even though such stub may be firmly engaged in the sealing member and would not drop or be pulled out easily after the gripping pressure of an ordinary holder has been released.

Other features reside in the adjustability for wear on both jaws, or adjustability for different sizes of electrodes, the inclusion in the holder of a trigger-operated valve to control the flow of gas, liquid or powder through the holder, and the offset connections of the electric cable and of the hose inside the handle, for space saving.

Various forms of construction of a holder according to the invention are shown in the accompanying drawings, where identical reference numbers designate parts performing identical functions, and in which;

Figure 1 is a side view of the electrode holder for manual arc-welding with the parts in the closed or operating position and certain parts in section, Fig. 2 is a side view of the holder of Fig. 1 in the opened or changing position, Fig. 3 is a cross-section taken on line 3—3 of Fig. 1, Fig. 4 is a cross-section taken on line 4—4 of Fig. 1 without the electrode, Fig. 5 is a cross-section taken on line 5—5 of Fig. 1, Fig. 6 is a longitudinal sectional view of a modified holder with the parts in the closed position, Fig. 7 is a side view of the gripping member of the holder of Fig. 6 with the parts in the opened position, Fig. 8 is a plan view of the gripping mechanism of Fig. 7, Fig. 9 is a cross-section taken on line 9—9 of Fig. 6 in the direction of the arrows, Fig. 10 is a cross-section taken on line 10—10 of Fig. 6, Fig. 11 is a longitudinal section of a modified holder, Fig. 12 is a side view of a detail of Fig. 11, Fig. 13 is an end view of the detail of Fig. 12, and Fig. 14 is a longitudinal section of another modified holder.

In Figs. 1 to 14 a fixed adjustable jaw member 1 is mounted in a pair of U-shaped members 7 which cooperates with a slidable jaw member 24 which is mounted in the members 7. The members 7 are pivotally mounted by means of a pin or bolt 2 on a body or frame 3. A rod 8 has right and left threaded end sections which cooperate with the jaw 24 at one threaded section and with a bearing member 25 at the other threaded section, the bearing member 25 being secured in the frame 3. An adjusting screw 11 is provided in the free ends of the members 7 to adjust the position of the jaw 1 in the members 7. Both jaws 1 and 24 are maintained in line with each other by the guiding action of the members 7. In the closed position the center of contact between the electrode 29 and the jaws and both pivoting centers 2 and 25, are substantially on the same straight line, in or slightly beyond the so-called "dead center" position of a toggle mechanism.

The tools of Figs. 6 to 14 show a casing 12 provided with a valve 13 operable by a pivoted handle 14. A hose connection 15 supplies the gas or other fluid and 16 indicates the electric cable. A handle 17 is provided with an anti-spatter shield 18. A nozzle or connecting socket 19 is provided with a sealing member 20 for the electrode.

In the modified structure of Fig. 11 a body member 21 is provided with a projection 22 which is hollow to receive a spring 23 acting against a piston 34. A cylinder-shaped bearing member 25 is provided in the projection 22 and one end of the rod 8 is threaded into this member 25.

In Fig. 14 the spring 23 is provided with a set screw 26 which is located approximately midway in the projection 22 to hold the spring fast in the middle of its length so that both centers 25 and 2 will move symmetrically and in opposite directions with respect to the holder.

The fundamental parts in all of the holders of the invention are the long-centered jaw 1 pivoting around a pin 2 which is fixed with respect to the casing 3, 12 or 21 of the holder except in Fig. 14 where it is permitted to move in an appropriate slot in the body or casing 21, and the short-centered jaw 24 pivoting around the center 25 which is either fixed or movable with respect to the holder body 3, 12 or 21.

When inserting an electrode 29 in the holder, Fig. 1, the operator first rotates the arm 7 as far down as it will go, Fig. 2 which separates the jaw 24 from jaw 1. After introducing the stub 29 loosely between the jaws, to a length best determined by holding the thumb nail against the end of the bare portion of the stub of the electrode, the operator closes the arm 7 upward from the position of Fig. 2 to that of Fig. 1, pushing it with the hand holding the electrode, while the body of the holder is held in position by the other hand, by means of the handle 17. This motion is free until contact is reached between the jaws and the electrode, then the operator must push harder to reach the dead-center position. This can be done, either directly by continuation of the first motion, or by taking hold of the head 12, Fig. 6, of the holder with two or more fingers of the hand holding the electrodes and squeezing the member 7 and head 12 together in that hand. In Figs. 6 to 14, the last part of the motion will force the electrode stub exactly into or against the sealing member 20, which may be of any known type, such as a rubber washer fitting tight around or against the stub of the hollow electrode. Such exact centering is important, and will be facilitated if one of the jaws (or both) is grooved in V-shape to avoid lateral deflection of the electrode in the holder, as shown in Figs. 4 and 8.

The offset shape of the arm 7, Figs. 6 to 14, as compared with a straight shape as in Figs. 1 and 2, is justified by the need of entering the stub end of the electrode in the sealing member 20 as nearly straight as possible. This is obtained by locating center 2 on, or very near to, and perpendicular to the electrode at the sealing point of the stub. The motion of penetration is then tangential, which is practically equivalent, for a short stroke, to a purely linear motion of the electrode along is own axis.

Adjustment is provided by the limit screw 11 and the right and left threaded connecting member 8. It is apparent that no amount of pulling back on the handle 17 of the holder will open the grip of the jaws should the electrode become accidentally stuck on the work. Depressing the handle downward, however, will release the pressure if desired.

In Figs. 1 to 10, the amount of pressure on the electrode is determined by the extent of deformation permitted to the jaw connecting members 8 and 7. Since these members are very rigid, this pressure can be very high, up to one ton or more. It can even be so high as to damage the tool itself if misadjusted. To avoid this danger, in Figs. 11 and 14, the additional spring 23 is used, which also permits the use of different sizes of electrodes without readjustment.

A spring similar to spring 23, of course, could be installed also in the holder of Fig. 1. To prevent unnecessary fatigue to the operator, the length of the connecting member 8 should be so adjusted that the pressure of the spring only begins to bear on the jaws when the toggle mechanism is nearly completely closed. At that point, deflection of the heavy spring is easy because of the near dead-center position of the jaw connecting members. Up to that point, however, the spring 23 was held in check under a comparatively heavy pre-load, by permitting pivot member 25 to abut against the end of the slot in the holder body. In Fig. 14, the spring 23 is held fast in the middle of its length by the set-screw 26 to force both centers 2 and 25 to move symmetrically and in opposite directions with respect to the holder. Similarly, jaws 1 and 24, at least in the near-closed and in the closed position, move symmetrically with respect to the sealing head 20, when various sizes of electrodes are used.

In all cases, the ejection of the stub from the sealing head is positive, by a simple opening motion of the connecting member 7. In the first part of that motion, high jaw pressure is maintained, thus extracting the stub despite strong adherence in the sealing member 20. Later the jaws open and liberate the stub which now falls off freely. As shown in Fig. 14, by way of an example, all exposed parts of the holder can be electrically insulated against accidental contacts, protecting both the operator and the tool. Sleeves 30 and 31, Fig. 14, may be used to cover such parts, and are made of plastic, rubber or the like.

It will be noted that the jaw 24 is so arranged and has a configuration in order to follow in alignment the axis of rotation of the bearing 25 and the rod 8, as for instance shown in Figs. 1 and 2. This is necessary since the center of rotation of the member 7 is at the pin 2 which is spaced from the bearing 25. In Figs. 11 and 14 the jaw 24 has a bearing 32 which rotates in the jaw as the latter slides when the holding member is raised to the clamping position or lowered to the unclamping position.

It is obvious that the various holders are capable of being modified within the scope of the appended claims. Also it is not necessary that all parts shall be used but the parts are capable of use in sub-combinations.

I claim as my invention;

1. An electrode holder for electric arc welding or cutting or the like with tubular electrodes, comprising a handle, a body mounted on the handle, a gas connection supported on the body, a pair of cooperating gripping jaws pivotally mounted on the body and adapted to swing from a position remote from the gas connection to a position adjacent the gas connection and insert the end of a tubular electrode into the gas connection, and means operative by swinging the jaws toward the gas connection for locking the jaws and operative by swinging the jaws away from the gas connection for releasing the jaws.

2. An electrode holder for electric arc welding or cutting or the like with tubular electrodes, which comprises a body, a gas connection including a push fitting on the body adapted to make gas supply contact with the end of an electrode, a pair of cooperating gripping jaws pivotally mounted on the body and swingable from a position remote from the push fitting to a position adjacent the push fitting and a toggle interconnecting one of the cooperating jaws and the body and locked by swinging the jaws toward the push fitting.

3. An electrode holder for electric arc welding or cutting or the like with tubular electrodes, comprising a body, a gas connection including a push fitting mounted on the body and extending transversely, a channel member pivotally mounted on the body and swingable transversely from a position adjoining the push fitting to a position remote therefrom, a relatively fixed jaw mounted on the channel member, a relatively movable jaw slidable in the channel member and cooperating with the relatively fixed jaw to provide a gripping space which in closed position aligns with the push connection, and a toggle operative by swinging the channel member for closing the jaws.

4. An electrode holder for electric arc welding or cutting or the like with tubular electrodes, comprising a body, a gas connection including a push fitting mounted on the body and extending transversely, a channel member pivotally mounted on the body and swingable transversely from a position adjoining the push fitting to a position remote therefrom, a relatively fixed jaw mounted on the channel member, a relatively movable jaw slidable in the channel member and cooperating with the relatively fixed jaw to provide a gripping space which in closed position aligns with the push fitting, and a spring toggle interconnecting the relatively movable jaw with the body and closing and locking that jaw by the break of the toggle when the channel member is swung to a position adjacent the push fitting.

5. An electrode holder for electric arc welding or cutting or the like with tubular electrodes, comprising a body, a gas supply connection having a push fitting mounted on the body, a pair of cooperating gripping jaws, and two operating members pivoting around separate centers on the body in the same plane, each member rigidly holding one jaw and one of the jaws being perpendicular to its operating member, the jaws being movable with respect to the members, and the pivoting centers being substantially in a straight line with respect to the centers of both jaws in the locked position of the holder and the pivoting center of the member having a perpendicular jaw being substantially on a perpendicular to the electrode, passing through the push fitting.

6. An electrode holder for electric arc welding or cutting or the like with tubular electrodes, comprising a body, a gas connection having a push fitting extending transversely to the body, a channel operating member pivoted on the body and swingable transversely of the body from a position adjacent the open end of the push fitting to a position remote therefrom, a relatively fixed jaw mounted on the channel member, a cooperating relatively movable jaw slidable in the channel member, a toggle arm pivotally connected to the relatively movable jaw and to the body at a location between the pivotal mounting of the channel member and the push fitting, and a spring resiliently urging the pivot of the toggle member on the body away from the pivotal support of the channel member on the body.

7. An electrode holder for electric arc welding or cutting or the like with tubular electrodes, comprising a body, a gas connection having a push fitting extending transversely to the body, a channel operating member pivoted on the body and swingable transversely of the body from a position adjacent the open end of the push fitting to a position remote therefrom, a relatively fixed jaw mounted on the channel member, an adjustment for the relatively fixed jaw with respect to the channel member, a cooperating relatively movable jaw slidable in the channel member, a toggle arm pivotally connected to the relatively movable jaw and to the body at a location between the pivotal mounting of the channel member and the push fitting, and a spring resiliently urging the pivot of the toggle member on the body away from the pivotal support of the channel member on the body.

RENE D. COLINET.

REFERENCES CITED

The following references are of record in the file of this patent:

UNITED STATES PATENTS

| Number | Name | Date |
| --- | --- | --- |
| 1,865,003 | Hall | June 28, 1932 |
| 2,151,552 | Jandos | Mar. 21, 1939 |
| 2,277,894 | Welsh | Mar. 31, 1942 |
| 2,358,220 | Donnelly | Sept. 12, 1944 |
| 2,407,836 | Ketelbey et al. | Sept. 17, 1946 |
| 2,412,717 | Cotton | Dec. 17, 1946 |